US00RE35471E

United States Patent [19]

Weishew

[11] E Patent Number: Re. 35,471

[45] Reissued Date of Patent: Mar. 11, 1997

[54] SEAL FOR FOUNTAIN CHAMBERED DOCTOR BLADE FOR A FLEXOGRAPHIC PRINTING PRESS

[75] Inventor: Joseph J. Weishew, Springfield, Pa.

[73] Assignee: The Langston Corporation, Cherry Hill, N.J.

[21] Appl. No.: 528,368

[22] Filed: Sep. 14, 1995

Related U.S. Patent Documents

Reissue of:

[64] Patent No.: 5,243,907
Issued: Sep. 14, 1993
Appl. No.: 824,822
Filed: Jan. 22, 1992

[51] Int. Cl.[6] ..... B41F 31/00

[52] U.S. Cl. ..... 101/208; 101/364

[58] Field of Search ..... 101/208, 207, 101/210, 364, 367, 366

[56] References Cited

U.S. PATENT DOCUMENTS

| | | | |
|---|---|---|---|
| 3,339,485 | 9/1967 | Rytterholm | 101/363 |
| 3,831,517 | 8/1974 | Wagner | 101/208 |
| 4,165,688 | 8/1979 | Leanna et al. | 101/207 |
| 4,316,428 | 2/1982 | Flaum et al. | 118/203 |
| 4,559,871 | 12/1985 | Kutzer et al. | 101/207 |
| 4,667,595 | 5/1987 | Geretzki | 101/207 |
| 4,754,701 | 7/1988 | Batke et al. | 101/207 |
| 4,796,528 | 1/1989 | Sarazen | 101/208 |
| 4,810,570 | 3/1989 | Rutten et al. | 428/318.6 |
| 4,991,504 | 2/1991 | Fina | 101/208 |
| 5,003,876 | 4/1991 | Harrison et al. | 101/350 |
| 5,012,736 | 5/1991 | Van Kanegan et al. | 101/211 |
| 5,085,144 | 2/1992 | Lindstrom et al. | 101/363 |

FOREIGN PATENT DOCUMENTS 924401 4/1963 United Kingdom .

*Primary Examiner*—Edgar S. Burr
*Assistant Examiner*—Anthony H. Nguyen
*Attorney, Agent, or Firm*—Seidel, Gonda, Lavorgna & Monaco, PC

[57] ABSTRACT

A [divider] seal for a [split-fountain] *fountain* chambered doctor blade for a printing press, comprising a seal contoured to sealingly engage a circumferential surface of a rotating cylinder, a seal retainer for retaining the seal in sealing engagement with the rotating cylinder, and pneumatic biasing structure, such as a pneumatic bladder, acting on the seal retainer for resiliently biasing the seal into sealing engagement with the rotating cylinder.

24 Claims, 2 Drawing Sheets

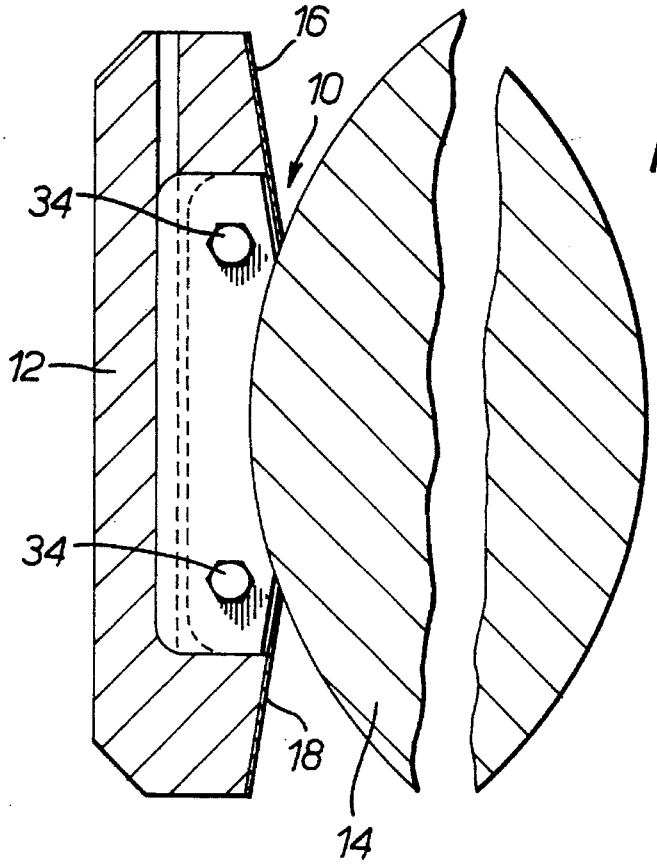
Fig. 1.
Fig. 2.
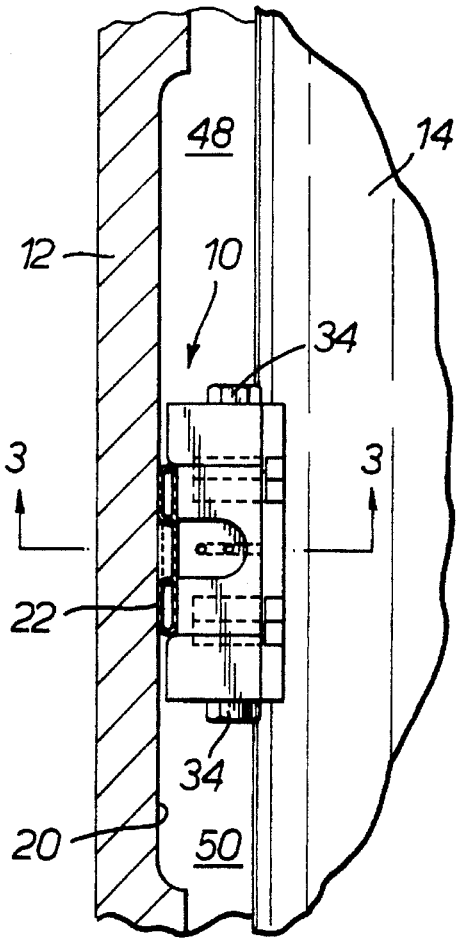

SEAL FOR FOUNTAIN CHAMBERED DOCTOR BLADE FOR A FLEXOGRAPHIC PRINTING PRESS

Matter enclosed in heavy brackets [ ] appears in the original patent but forms no part of this reissue specification; matter printed in italics indicates the additions made by reissue.

FIELD OF THE INVENTION

The present invention relates to flexographic printing presses, in particular flexographic printing presses which utilize a chambered doctor blade ink fountain. The invention finds particular utility in connection with split-fountain chambered doctor blades which permit simultaneous printing with two or more different color inks, where the seal of the present invention may be used to divide the chambered doctor blade into two or more chambers, but the present invention is useful in other contexts where it is desired to effect a seal with respect to a rotating cylinder, *such as an end seal*. Thus, although the invention is described in the context of a flexographic printing press, the invention is not limited to use in such devices.

BACKGROUND OF THE INVENTION

Flexographic printing is a rotary letter press printing process which traditionally uses flexible rubber, or other elastomer, printing plates and liquid, fast drying ink. An advantage of flexographic printing is its simple ink distribution system.

In flexographic printing, a web to be imprinted is passed between an impression cylinder and a plate cylinder, from which the ink is transferred to the web. Ink is applied to the plate cylinder in precisely-controlled quantities by an anilox metering roll. The circumferential surface of the anilox roll is divided into a very large number of small cells (typically, 15,000 cell per square centimeter). The surface of the anilox roll is flooded with ink, thus filling the cells on the roll's surface. Ink is fed to the anilox roll by an ink fountain. A commonly-used ink fountain comprises an ink reservoir and a pair of doctor blades which contact the anilox roll above and below the reservoir. The surface of the anilox roll, the doctor blades and the reservoir define a closed chamber for containing the ink. As the anilox roll rotates, the doctor blades shave surplus ink from the surface of the anilox roll so that ink is carried only in the interior of the cells on the roll's surface and not on the lands between cells. This results in a uniformly metered film of ink being applied to the surface of the plate cylinder.

Typically, the ink fountain extends the entire length of the anilox roll and plate cylinder. In cases where it is desired to print more than one color on a web, which requires more than one color of ink, the chamber containing the ink in the ink fountain is divided into two or more subchambers or compartments by ink dams or dividers. These dividers are designed to maintain a fluid-tight seal between compartments in the ink fountain and to maintain a seal against the anilox roll.

Ink fountain dividers per se are known in the art, and are illustrated in, for example, U.S. Pat. Nos. 3,381,517, 4,559,871, 4,667,595, and 4,796,528.

U.S. Pat. No. 3,831,517 discloses an apparatus for resiliently urging a seal member against a roller in the context of a fountain divider for a printing press ink fountain. The seal member is urged against the roller by a flat flexible spring strap with an arcuate outside surface which engages the sealing member. The biasing force exerted by the spring strap on the seal member can be adjusted by means of an adjusting rod, one end of which engages the spring strap and the other end of which engages a desired serration in a saw-toothed member.

U.S. Pat. No. 4,559,871 discloses divider plates for an ink dividing assembly for an inking roller in an ink fountain of a rotary printing press, with the divider plates resiliently biased against the ink roller. The divider plates are shown in conjunction with a chambered doctor blade assembly. The divider plates are slidingly mounted in guide plates. The front surface of the divider plates is curved and engages an inking roller. The divider plates are spring-biased into contact with the inking roller by leaf springs.

U.S. Pat. No. 4,667,595 discloses divider plates between axially-spaced doctor bars in an inking system for a rotary printing press. The divider plates rotate about a pin whose axis is parallel to the axis of the inking roller so that they are biased against the inking roller by gravity.

U.S. Pat. No. 4,796,528 shows a separator element located within a chambered doctor blade ink fountain to separate the fountain into axial zones. The separator element comprises a separator strip which extends over a portion of the surface of an anilox roller. A thin film of liquid, such as water or an aqueous solution of alcohol, is supplied to the separator strip so that the strip rides on a liquid film between the strip and the anilox roller, thus forming a fluid seal between axial zones in the ink fountain.

It will be appreciated that all of these prior arrangements are mechanically very complex. They are thus expensive to fabricate, require careful and precise alignment, and are susceptible to misalignment in use. There is therefore a need for a simple, inexpensive divider seal which is easy to fabricate and install, requires no time-consuming alignment, can compensate for wear and misalignment, and still provides an effective [divider] seal. The present invention fulfills that need.

SUMMARY OF THE INVENTION

The present invention is a [divider] seal for a [split-fountain] *fountain* chambered doctor blade for a printing press, comprising seal means contoured to sealingly engage a circumferential surface of a rotating cylinder, retaining means for retaining the seal means in sealing engagement with the rotating cylinder, and pneumatic biasing means acting on the retaining means for resiliently biasing the seal means into sealing engagement with the rotating cylinder.

The pneumatic biasing means offers a high degree of compliance and allows for variations in wear and alignment in use.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a side elevational view, partially in section, of an ink fountain and an anilox roll, which the ink fountain being equipped with the divider seal according to the present invention.

FIG. 2 is a top plan view, partially broken away, of the divider seal and anilox roll shown in FIG. 1.

DESCRIPTION OF THE INVENTION

Figure 4:
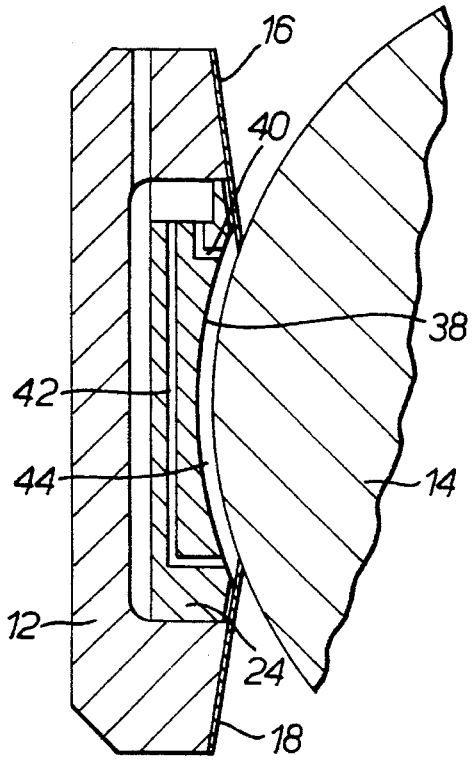
FIG. 4 is a sectional view, partially broken away, taken along the lines 3—3 of FIG. 2.

Referring now to the drawings, wherein like numerals indicate like elements, there is shown in FIG. 1 a divider seal 10 according to the present invention, mounted in a chambered doctor blade ink fountain 12, in sealing engagement with an anilox roll 14. Anilox roll 14 has already been described and is known in the art, and need not be described in further detail, except to note that, as previously described, anilox roll 14 rotates on its axis relative to ink fountain 12. Also, ink fountain 12 has already been described and is known in the art, and will be described only with the degree of detail necessary to understand the present invention. In that regard, ink fountain 12 comprises an upper 16 and a lower 18 doctor blade which contact the surface of the anilox roll and meter the amount of ink supplied to the anilox roll by ink fountain 12. Doctor blades 16 and 18 are conventional and known in the art.

As seen in FIG. 1, divider seal 10 has a sealing surface which is contoured to and contacts the surface of anilox roll 14 which extends into ink fountain 12 between doctor blades 16 and 18. Divider seal 10 is otherwise dimensioned to fit within the chamber of chambered doctor blade ink fountain 12.

FIG. 2 illustrates the divider seal 10 as seen from above, with ink fountain 12 partially in section to permit divider seal 10 to be clearly seen. As best seen in FIG. 2, divider seal 10 is spaced a short distance from the rear wall 20 of ink fountain 12. Between the rear wall of ink fountain 12 and divider seal 10 is a biasing means in the form of a pneumatic bladder 22. Pneumatic bladder 22 may be pressurized and depressurized in conventional fashion to apply more or less biasing force to divider seal 10, thereby controlling the loading force of divider seal 10 against anilox roll 14.

Figure 3:
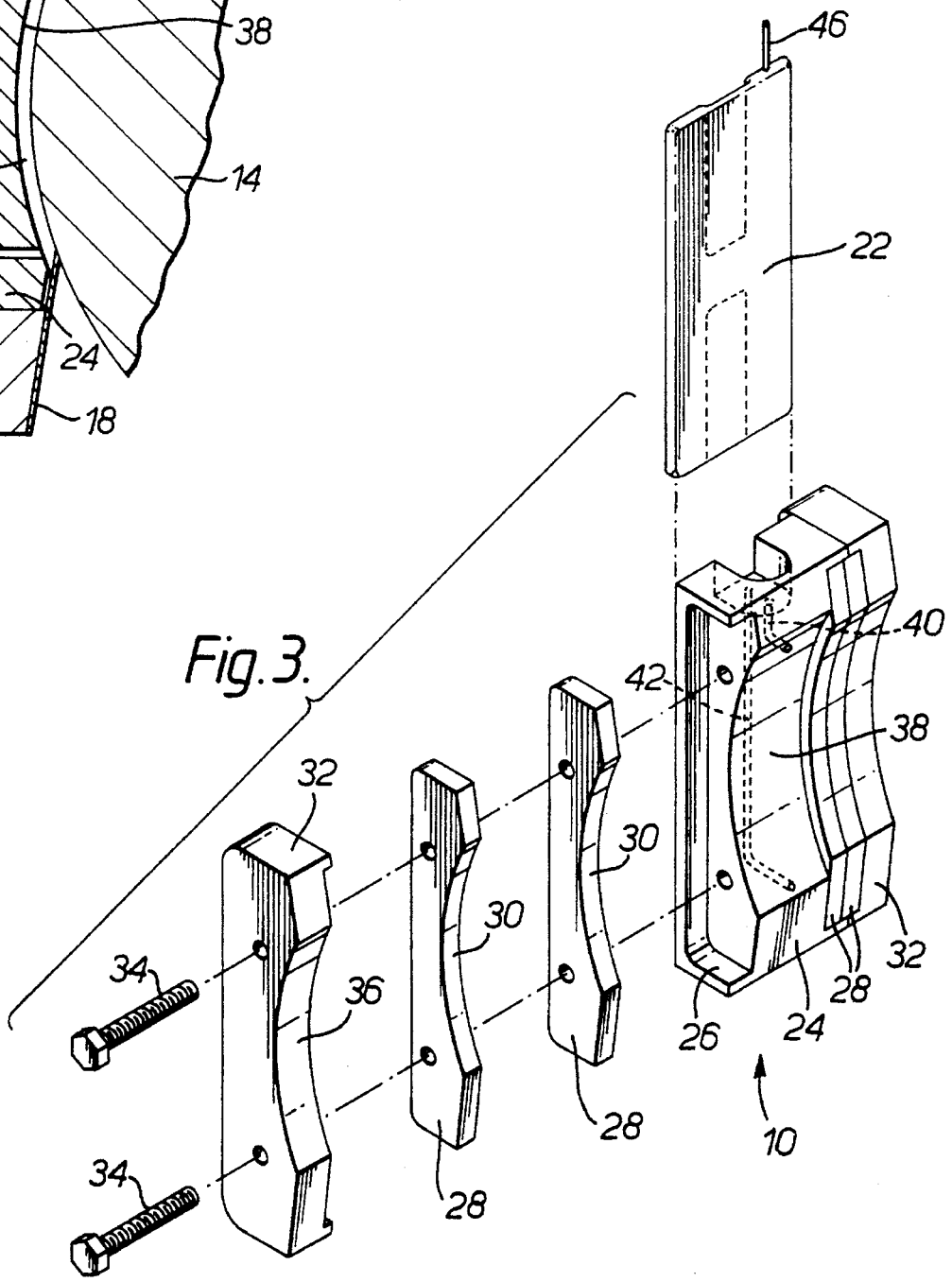
FIG. 3 is an exploded view of the divider seal according to the present invention.

Referring now to FIG. 3, the various parts of divider seal 10 are shown in an exploded view. Divider seal 10 comprises a manifold 24, which includes lateral recesses on either side. Recess 26 is visible in FIG. 3. Recess 26 receives at least one, and preferably two, seal members 28. Seal members 28 are preferably made of an ultrahigh molecular weight closed foam material, and each seal means has a contoured surface 30 contoured to the curvature of anilox roll 14 so as to intimately engage the surface of anilox roll 14 when the seal means 28 are brought into contact with the surface of anilox roll 14. Seal means 28 are retained in place with respect to manifold 24 by an end cap seal 32. Seal means 28 and end cap 32 may be retained on manifold 24 by any suitable means, such as threaded fasteners 34. End cap seal 32 also has a contoured surface 36, which has substantially the same contour as contoured surface 30 of seal means 28.

Manifold 24 is substantially symmetrical along its longitudinal axis, and therefore receives a pair of seal means 28 and an end cap seal 32 on both sides.

Manifold 24 may be made of any suitable material. For example, manifold 24 may be machined from aluminum, or molded in plastic. A preferred, but not necessarily the only, material for manifold 24 is aluminum with a Teflon® coating. End cap seals 32 are preferably, although not necessarily, molded from an ultrahigh molecular weight plastic. It should be understood, however, that the choice of materials for manifold 24 and end cap seals 32 is not critical to the present invention, and other materials can be used without departing from the scope of the invention. Likewise, although seal means 28 are preferably made from ultrahigh molecular weight closed foam material, other suitable sealing materials may be used without departing from the scope of the invention.

It will be seen in FIG. 3 that, as with seal means 28 and end cap seals 32, manifold 24 has a contoured surface 38. However, contoured surface 38 is contoured to a curvature having a radius slightly greater than the curvature of contoured surfaces 30 and 36 of seal means 28 and end cap seals 32. This provides a small gap between anilox roll 14 and contoured surface 38, as best seen in FIG. [3] *4*.

Referring now to FIG. 4, manifold 24 is shown in section. Manifold 24 includes a pair of liquid flow channels 40 and 42. (Channels 40 and 42 are shown in phantom in FIG. 3.) Liquid flow channels 40 and 42 serve to supply and drain water to the gap 44 between contoured surface 38 and anilox roll 14. Gap 44 forms a water reservoir defined by contoured surface 38, anilox roll 14 and top and bottom doctor blades 16 and 18. Water is preferably supplied to reservoir 44 through flow channel 40 and drained, preferably by vacuum, through channel 42. The water in reservoir 44 fills the interstices in seal means 28, so that there is a film of water between seal means 28 and the surface of anilox roll 14. The film of water serves as both a low-friction bearing and a fluid seal.

Seal means 28 are biased into sealing engagement with anilox roll 14 by the pneumatic bladder 22. Bladder 22 is positioned between manifold 24 and the rear wall 20 of ink fountain 12, as previously described. Air is supplied to and exhausted from bladder 22 through an air supply conduit 46. The air may be supplied and exhausted by any conventional means. By pressurizing bladder 22, seal means 28 are biased into sealing engagement with the surface of anilox roll 14. The biasing force can be controlled by controlling the internal pressure of bladder 22. Since bladder 22 is pneumatically pressurized, bladder 22 is resilient. That is, bladder 22 permits divider seal 10 to move toward and away from rear wall 20 as anilox roll 14 rotates, to compensate for variations in the surface of anilox roll 14, such as a slightly out-of-round condition or slight misadjustment, for example where the ink fountain 12 is not exactly parallel to the axis of anilox roll 14. In addition, bladder 22 enables divider seal 10 to move toward anilox roll 14 to compensate for wear of both the surface of anilox roll 14 and the contoured surface 30 of seal means 28, as a result of normal use. Since air is compressible fluid, bladder 22 can be pressurized to a degree that will enable divider seal 10 to move toward and away from rear wall 20 of ink fountain 12, as may be required by out-of-round conditions in anilox roll 14, misalignments, and wear.

It will be appreciated that ink fountain 12 can be divided into two or more compartments 48 and 50 (see FIG. 2) by using one or more divider seals 10. Thus, ink fountain 12 may be divided into two compartments 48 and 50 by using a single divider seal 10. If two divider seals are used, ink fountain 12 can be divided into three compartments, and so on, so that any number of compartments as desired may be provided.

It will also be noted that neither bladder 22 nor divider seal 10 are fixedly attached to rear wall 20 of ink fountain 12. Thus, divider seal 10 can be placed at any desired location along anilox roll 14, so that the lateral extent of the compartments 48 and 50 can be infinitely variable. Thus, the invention permits not only any desired number of compartments to be formed in ink fountain 12, but enables the lateral extent of the compartments so formed to be infinitely varied as desired. Hence, the present invention makes it very simple to reconfigure ink fountain 12 for different colors and dimensions. This reduces set-up time between printing runs, thereby reducing press down time and increasing equipment utilization and throughput.

The present invention may be embodied in other specific forms without departing from the spirit or essential attributes thereof and, accordingly, reference should be made to the appended claims, rather than to the foregoing specification, as indicating the scope of the invention.

I claim:

1. A [divider] seal for a [split-fountain] chambered doctor blade for a printing press, comprising a. seal means contoured to sealingly engage a circumferential surface of a rotating cylinder, b. retaining means for retaining the seal means in sealing engagement with the rotating cylinder, c. pneumatic biasing means positionable with the retaining means and acting on the retaining means for resiliently biasing the seal means into sealing engagement with the rotating cylinder; and means for mounting the retaining means and the pneumatic biasing means for axial movement together along the surface of the cylinder, thereby allowing the retaining means and the pneumatic biasing means to be selectably positionable along the surface of the cylinder.

2. A [divider] seal according to claim 1, wherein the pneumatic biasing means comprises a pneumatic bladder.

3. A [divider] seal according to claim 2, said pneumatic bladder further comprising a conduit for selectably permitting an increase or decrease in pneumatic pressure in said bladder.

4. A [divider] seal according to claim 2, wherein the seal means comprises an ultra-high molecular weight closed foam.

5. A [divider] seal according to claim 1, further comprising a gap between the retaining means and the circumferential surface of the rotating cylinder, and means for supplying a liquid to said gap to form a liquid interface between said retaining means and circumferential surface.

6. A [divider] seal according to claim 1, wherein said retaining means comprises recess means for receiving the pneumatic biasing means, thereby fixedly attaching the biasing means to the retaining means.

7. In a flexographic printing press having an anilox roller with an outer circumferential surface and a chambered doctor blade ink fountain adjacent the anilox roller for applying printing ink thereto, a positionable divider seal for dividing the doctor blade chamber into at least two compartments, the compartments containing different color inks therein, said divider seal comprising a seal member contoured to and in sealing engagement with the outer circumferential surface of the anilox roller, a seal retainer for retaining the seal member in engagement with the circumferential surface of the anilox roller, and an inflatable and deflatable pneumatic bladder operatively engaged with the seal retainer and positionable with said divider seal for applying a biasing force to the seal retainer and the seal member for resiliently biasing the seal member into engagement with the circumferential surface of the anilox roller, and means for mounting the divider seal and the bladder for axial movement together along the surface of the roller, thereby allowing the divider seal and the bladder to be selectably positionable along the surface of the roller.

8. [A divider seal] *In a flexographic printing press* according to claim 7, wherein said pneumatic bladder is positioned between the seal retainer and a rear wall of the ink fountain.

9. [A divider seal] *In a flexographic printing press* according to claim 8, wherein the divider seal and the pneumatic bladder are both longitudinally positionable with respect to said rear wall of the ink fountain, thereby allowing the divider seal to be infinitely positionable along the length of the anilox roll between the anilox roll and said rear wall of the ink fountain.

10. [An inflatable and deflatable pneumatic bladder] *In a flexographic printing press* according to claim 7, wherein said divider seal comprises recess means for receiving the bladder, thereby fixedly attaching the bladder to the divider seal.

11. Printing apparatus comprising an ink fountain mounted adjacent to a roll adapted to receive a film of ink from the fountain, the fountain comprising an ink chamber extending parallel to the axis of the roll and containing a chamber divider having a first preselected width which is selectably positionable at various positions in the chamber, the chamber divider including at least one sealing portion having a concave surface adjacent to and conforming with the surface of the roll, and including a bladder positioned between a back surface of the divider and an opposed wall of the chamber and adapted to seal the gap between the said back surface and the chamber wall and, when pressurized, to bias the concave seal surface of the divider resiliently into sealing engagement with the roll, the bladder having a second preselected width which is not greater than the first preselected width.

12. Printing apparatus according to claim 11, in which the chamber divider includes a second sealing portion spaced from and similar to the first-mentioned sealing portion, the surface of the divider between the sealing portions being recessed to define a semi-annular chamber adjacent to the roll, and including means for delivering liquid into the semi-annular chamber to form an additional barrier, supplementing the sealing effects of the seal portions, between inks contained during use in the portions of the ink chamber on opposite sides of the divider.

13. Printing apparatus according to claim 11, wherein the back surface of the divider comprises recess means for receiving the bladder, thereby attaching the bladder to said divider.

14. Printing apparatus according to claim 13, in which said recess means hold said bladder so as to allow said bladder to be positionable with said divider.

15. Printing apparatus according to claim 11, in which the said back surface of the divider and the said opposed chamber wall are both substantially flat and are both substantially parallel to a tangent to the roll at approximately a midpoint along the said concave surface of the sealing portion, whereby expansion of the bladder produces a series of biasing forces on the divider which are substantially parallel to a radius of the roll at the said midpoint.

16. Printing apparatus according to claim 15, in which the chamber divider includes a second sealing portion spaced from and similar to the first-mentioned sealing portion, the surface of the divider between the sealing portions being recessed to define a semi-annular chamber adjacent to the roll, and including means for delivering liquid into the semi-annular chamber to form an additional barrier, supplementing the sealing effects of the seal portions, between inks contained during use in the portions of the ink chamber on opposite sides of the divider.

17. A [divider] seal in a [split-fountain] chambered doctor blade for a printing press having an ink chamber, comprising a. seal means contoured to sealingly engage a circumferential surface of a rotating cylinder, b. retaining means having a first preselected width for retaining the seal means in sealing engagement with the rotating cylinder, [and]

c. pneumatic biasing means, disposed between a back surface of said retaining means and an opposed wall of said ink chamber and acting on the retaining means for resiliently biasing the seal means into sealing engagement with the rotating cylinder, the pneumatic biasing means having a second preselected width which is not greater than the first preselected width, *and*

*d. said retaining means and pneumatic biasing means being slideably movable into different positions along said cylinder.*

18. A [divider] seal according to claim 17, wherein said retaining means is positionable to various positions within the ink chamber, said retaining means comprising recess means for receiving the pneumatic biasing means, thereby fixedly attaching the biasing means to the retaining means, said recess means holding said biasing means so as to allow said pneumatic biasing means to be positionable with said retaining means.

19. A [divider] seal according to claim 17, wherein said retaining means comprises recess means for receiving the pneumatic biasing means, thereby fixedly attaching the biasing means to the retaining means.

20. In a flexographic printing press having an anilox roller and a chambered doctor blade ink fountain adjacent the anilox roller for applying printing ink thereto, a divider seal having a first preselected width for dividing the doctor blade chamber into at least two compartments, the compartments containing different color inks therein, said divider seal comprising a seal member contoured to and in sealing engagement with the outer circumferential surface of the anilox roller, a seal retainer for retaining the seal member in engagement with the circumferential surface of the anilox roller, and an inflatable and deflatable pneumatic bladder mounted between a back surface of the divider seal and an opposed wall of the doctor blade chamber for applying a biasing force to the seal retainer and the seal member for resiliently biasing the seal member into engagement with the circumferential surface of the anilox roller, the bladder having a second preselected width which is not greater than the first preselected width.

21. [A bladder] *In a flexographic printing press* according to claim [29] *20* wherein said divider seal is selectably positionable at various positions in the chamber, the divider seal comprising recess means for receiving the bladder, thereby fixedly attaching the bladder to the divider seal so as to allow the bladder to be positionable with said divider seal.

22. [A bladder] *In a flexographic printing press* according to claim 20 wherein said divider seal comprises recess means for receiving the bladder, thereby fixedly attaching the bladder to the divider seal.

23. Printing apparatus comprising an ink fountain mounted adjacent to a roll adapted to receive a film of ink from the fountain, the roll having an outer circumferential surface, the fountain comprising an ink chamber extending parallel to the axis of the roll, at least a portion of the chamber containing a chamber [divider] *seal member* which is selectably positionable at various positions in the chamber, the chamber [divider] *seal member* including at least one sealing portion having a concave surface adjacent to and conforming with the surface of the roll, and including a bladder selectable positionable with the [divider] *seal member*, and adapted to seal the gap between the said back surface and the chamber wall and, when pressurized, to bias the concave seal surface of the [divider] *seal member* resiliently into sealing engagement with the roll, and means for mounting the [divider] *seal member* and the bladder for axial movement together along the surface of the roll, thereby allowing the [divider] *seal member* and bladder to be selectably positionable along the surface of the roll.

*24. A seal for a chambered doctor blade for a printing press, comprising:*

*seal means contoured to sealingly engage a circumferential surface of a rotating cylinder, the seal means being positionable at an end of the chambered doctor blade;*

*retaining means for retaining the seal means in sealing engagement with the rotating cylinder;*

*pneumatic biasing means acting on the retaining means for resiliently biasing the seal means into sealing engagement with the rotating cylinder; and*

*means for mounting the retaining means and the pneumatic biasing the seal means for axial movement together along the surface of the cylinder, thereby allowing the retaining means and the pneumatic biasing means to be selectably positionable along the surface of the cylinder.*

* * * * *